United States Patent
Huang et al.

(10) Patent No.: US 10,518,342 B2
(45) Date of Patent: Dec. 31, 2019

(54) HYDRAULIC TWO-SIDE ROLLING-CUT SHEARS

(71) Applicant: Taiyuan University of Science and Technology, Taiyuan (CN)

(72) Inventors: Qingxue Huang, Taiyuan (CN); Lifeng Ma, Taiyuan (CN); Jinli Meng, Taiyuan (CN); Zhibing Chu, Taiyuan (CN); Heyong Han, Taiyuan (CN); Hongjie Li, Taiyuan (CN); Yugui Li, Taiyuan (CN)

(73) Assignee: TAIYUAN UNIVERSITY OF SCIENCE AND TECHNOLOGY, Taiyuan (CN)

( * ) Notice: Subject to any disclaimer, the term of this patent is extended or adjusted under 35 U.S.C. 154(b) by 213 days.

(21) Appl. No.: 15/641,308

(22) Filed: Jul. 4, 2017

(65) Prior Publication Data
US 2017/0297121 A1 Oct. 19, 2017

Related U.S. Application Data

(63) Continuation-in-part of application No. PCT/CN2015/093201, filed on Oct. 29, 2015.

(30) Foreign Application Priority Data

Jun. 25, 2015 (CN) .......................... 2015 1 0357766

(51) Int. Cl.
*B23D 15/06* (2006.01)
*B23D 15/14* (2006.01)
(Continued)

(52) U.S. Cl.
CPC ............. *B23D 15/06* (2013.01); *B23D 15/14* (2013.01); *B23D 36/0008* (2013.01); *B23K 26/38* (2013.01)

(58) Field of Classification Search
CPC ........ B23D 15/00; B23D 15/02; B23D 15/04; B23D 15/06–10; B23D 15/14;
(Continued)

(56) References Cited

U.S. PATENT DOCUMENTS 3,555,951 A * 1/1971 Greis ..................... B23D 31/04
83/208
4,682,401 A * 7/1987 Tadashi .................. B21D 28/00
29/34 R

FOREIGN PATENT DOCUMENTS

CN 201046512 * 4/2008
CN 201329442 * 10/2009
(Continued)

*Primary Examiner* — Evan H MacFarlane
(74) *Attorney, Agent, or Firm* — Matthias Scholl P.C.; Matthias Scholl

(57) ABSTRACT

Hydraulic two-side rolling-cut shears, including: a front transport roller device, a rear transport roller device, a shear body, and a roller carrier. The front transport roller device includes a laser scriber, a magnetic alignment device, and a pinch roller device. The rear transport roller device includes a vertical guide roller. The laser scriber is disposed on the front end of the front transport roller device. The magnetic alignment device is disposed in the middle part of the front transport roller device. The pinch roller device is disposed on the rear end of the front transport roller device in front of the shear body. The roller carrier is disposed longitudinally in the middle of the shear body. The vertical guide roller is disposed on the rear transport roller device and behind the shear body.

8 Claims, 17 Drawing Sheets

(51) Int. Cl.
  *B23D 36/00*    (2006.01)
  *B23K 26/38*    (2014.01)
(58) Field of Classification Search
  CPC ...... B23D 33/00; B23D 33/006; B23D 33/02;
     B23D 36/00; B23D 36/0008; B23D
     36/0033; B23D 35/005; B23D 31/00;
     B23D 31/04; B26D 1/09; B26D 1/095;
     B23K 26/03; B23K 26/032; B23K 26/38;
     B23K 26/70
  See application file for complete search history.

(56) References Cited

FOREIGN PATENT DOCUMENTS

| | | | | |
|---|---|---|---|---|
| CN | 201338131 | * | 11/2009 | ............. B23D 15/14 |
| CN | 102120246 | * | 7/2011 | |

* cited by examiner

HYDRAULIC TWO-SIDE ROLLING-CUT SHEARS

CROSS-REFERENCE TO RELATED APPLICATIONS

This application is a continuation-in-part of International Patent Application No. PCT/CN2015/093201 with an international filing date of Oct. 29, 2015, designating the United States, now pending, and further claims foreign priority benefits to Chinese Patent Application No. 201510357766.X filed Jun. 25, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to hydraulic two-side rolling-cut shears.

Description of the Related Art

Conventional shears for cutting two sides of steel plates at the lengthwise direction include disc shears, guillotine shears, and mechanical rolling-cut shears. The disc shears cannot process steel plates with a thickness exceeding 30 mm. The guillotine shears have a relatively long shear travel, and the resulting products often contain collapsed corners. The mechanical rolling-cut shears have a complex drive unit, so they are costly to produce, assemble, and maintain.

SUMMARY OF THE INVENTION

In view of the above-described problems, it is one objective of the invention to provide a heavy hydraulic rolling-cut shears for cutting two sides of metal plates in the lengthwise direction. The shears have broad adaptability to various materials, stable output of shear force, high shear accuracy, and low production, operation, and maintenance costs.

To achieve the above objective, in accordance with one embodiment of the invention, there are provided hydraulic two-side rolling-cut shears, comprising a front transport roller device, a rear transport roller device, a shear body, and a roller carrier. The front transport roller device comprises a laser scriber, a magnetic alignment device, and a pinch roller device. The rear transport roller device comprises a vertical guide roller. The laser scriber is disposed on a front end of the front transport roller device. The magnetic alignment device is disposed in a middle part of the front transport roller device. The pinch roller device is disposed on a rear end of the front transport roller device in front of the shear body. The roller carrier is disposed longitudinally in the middle of the shear body. The vertical guide roller is disposed on the rear transport roller device in the rear of the shear body.

In a class of this embodiment, the shear body comprises a first hydraulic rolling-cut shears, a second hydraulic rolling-cut shears, a tool changing mechanism, and a locking device. The first hydraulic rolling-cut shears is mounted on a movable base to form a movable hydraulic rolling-cut shears. The movable hydraulic rolling-cut shears is configured to move on a guide rail. The locking device is disposed on bottoms of an entry rack and an exit rack to lock the movable hydraulic rolling cut shears on the movable base when a shearing width of steel plate is adjusted. The second hydraulic rolling-cut shears is disposed on a fixed base to form a fixed hydraulic rolling-cut shears. The first hydraulic rolling-cut shears and the second hydraulic rolling-cut shears are symmetrically disposed. The tool changing mechanism is disposed at the same side of the first hydraulic rolling-cut shears and the second hydraulic rolling-cut shears. A discharge chute is connected to a sliding chute.

In a class of this embodiment, the first hydraulic rolling-cut shears and the second hydraulic rolling cut shears each comprise an entry pinch roll, an entry drive linkage, the entry rack, an upper beam, a pressing mechanism, an adjusting mechanism, a first upper tool post, a scrap chopping mechanism, the exit rack, an exit drive linkage, a lower tool post, an exit pinch roll, a turning device, a connecting beam, and the sliding chute. The entry pinch roll, the entry drive linkage, and the entry rack are disposed at an inlet of the first hydraulic rolling-cut shears and the second hydraulic rolling cut shears. The exit rack, the exit drive linkage, and the exit pinch roll are disposed at an outlet of the first hydraulic rolling-cut shears and the second hydraulic rolling cut shears. The entry pinch roll is disposed at a front end of the entry rack. The entry drive linkage is mounted on the entry rack and is connected to the upper beam and one side of the first upper tool post. Two ends of the upper beam are mounted on upper parts of the entry rack and the exit rack. The first upper tool post is disposed at the middle between the entry rack and the exit rack, and is driven by the entry drive linkage and the exit drive linkage to move. The exit drive linkage is mounted on the exit rack, and is connected to the upper beam and the other side of the first upper tool post. The exit pinch roll is disposed lower than the exit rack. The pressing mechanism is disposed on one end of the first upper tool post. The adjusting mechanism is disposed on a top surface of the upper beam. The adjusting mechanism comprises pairs of movable wedges. Pairs of the movable wedges contact with the first upper tool post. The lower tool post is disposed lower than the entry rack, the exit rack, and the first upper tool post. The turning device is mounted on a front end of the lower tool post. The connecting beam is disposed on the other end of the first upper tool post. The scrap chopping mechanism is disposed on the connecting beam at an inner side of the exit rack. The sliding chute is disposed on one side of the lower tool post.

In a class of this embodiment, the entry drive linkage comprises a first servo hydraulic cylinder, a first connecting rod, a second connecting rod, a third connecting rod, a fourth connecting rod, a first pin shaft, a second pin shaft, and a third pin shaft. The first servo hydraulic cylinder, the first connecting rod, the second connecting rod, the third connecting rod, the fourth connecting rod, the first pin shaft, the second pin shaft, and the third pin shaft are disposed at the inlet of the first hydraulic rolling-cut shears and the second hydraulic rolling cut shears. The first servo hydraulic cylinder is hinged to the entry rack. A piston rod of the first servo hydraulic cylinder is connected to one end of the fourth connecting rod. The other end of the fourth connecting rod is hinged to one end of the first connecting rod, one end of the second connecting rod, and one end of the third connecting rod via the first pin shaft. The other end of the first connecting rod is hinged to an inlet side of the first upper tool post via the third pin shaft to drive the first upper tool post. The other end of the second connecting rod and the other end of the third connecting rod are hinged to the upper beam.

In a class of this embodiment, the exit drive linkage comprises a second servo hydraulic cylinder, a fifth connecting rod, a sixth connecting rod, a seventh connecting rod, an eighth connecting rod, a fourth pin shaft, a fifth pin shaft, and a sixth pin shaft. The second servo hydraulic cylinder, the fifth connecting rod, the sixth connecting rod, the seventh connecting rod, the eighth connecting rod, the fourth pin shaft, the fifth pin shaft, and the sixth pin shaft are disposed at the outlet of the first hydraulic rolling-cut shears and the second hydraulic rolling cut shears. The second servo hydraulic cylinder is hinged to the exit rack. A piston rod of the second servo hydraulic cylinder is connected to one end of the fifth connecting rod. The other end of the fifth connecting rod is hinged to one end of the sixth connecting rod, one end of the seventh connecting rod, and one end of the eighth connecting rod via the sixth pin shaft. The other end of the sixth connecting rod and the other end of the seventh connecting rod are hinged to the upper beam via the fifth pin shaft. The other end of the eighth connecting rod is hinged to an outlet side of the first upper tool post to drive the first upper tool post.

In a class of this embodiment, the first upper tool post comprises an upper tool post body, an upper blade box, a first locking cylinder, and a first upper blade. The first upper blade is mounted on the upper blade box. The upper blade box is disposed at one side of a lower part of the upper tool post body. A cylinder block of the first locking cylinder is mounted in a first cylinder hole on the lower part of the upper tool post body. A piston rod of the first locking cylinder is connected to a bolt of the upper blade box, and the upper blade box is fixed on the lower part of the upper tool post body.

In a class of this embodiment, the lower tool post comprises a lower tool post body, a lower blade box, a second locking cylinder, and a first lower blade. The first lower blade is mounted on the lower blade box. The lower blade box is disposed at one side of an upper part of the lower tool post body. A cylinder block of the second locking cylinder is mounted in a second cylinder hole on the upper part of the lower tool post body. A piston rod of the second locking cylinder is connected to a bolt of the lower blade box, and the lower blade box is fixed on the upper part of the lower tool post body.

In a class of this embodiment, the scrap chopping mechanism comprises a third hydraulic cylinder, an upper blade mechanism, a lower blade mechanism, a linkage mechanism, a hydraulic cylinder base, and a base. The lower blade mechanism comprises a third locking cylinder, a second lower blade, a pressing block, and a locking hook. The second lower blade is mounted on one side of the pressing block. The third locking cylinder is mounted in a third cylinder hole on the lower tool post. A piston rod of the third locking cylinder is connected to the locking hook. The locking hook is disposed on one side of the lower tool post, and the second lower blade is fixed on the lower tool post. The upper blade mechanism comprises a second upper blade, a fourth locking cylinder, a second upper tool post. The second upper blade is disposed on one side of a lower part of the second upper tool post. The fourth locking cylinder is mounted in a fourth cylinder hole on the lower part of the second upper tool post. A piston rod of the fourth locking cylinder is connected to bolt of the second upper tool post, and the second upper blade is fixed on the second upper tool post. The linkage mechanism comprises a ninth connecting rod, a tenth connecting rod, and a seventh pin shaft. A front end of the ninth connecting rod is hinged to an upper part of the tenth connecting rod via the seventh pin shaft, and a lower part of the tenth connecting rod is connected to an upper part of the second upper tool post. The hydraulic cylinder base is disposed on the exit rack. A cylinder block of the third hydraulic cylinder is hinged to the hydraulic cylinder base. A piston rod of the third hydraulic cylinder is hinged to a rear end of the ninth connecting rod. The ninth connecting rod is hinged to the base via an eighth pin shaft. The base is disposed on an upper part of the exit rack.

In a class of this embodiment, the adjusting mechanism comprises pairs of fixed wedges, pairs of the movable wedges, a fine adjustment mechanism, a worm and worm wheel lifting mechanism, a connecting shaft, a first reversing mechanism of bevel gears, a second reversing mechanism of bevel gears, a reducer, and a motor. A shaft of the motor is connected to an input shaft of the reducer. An output shaft of the reducer is connected to an input shaft of the second reversing mechanism of bevel gears. Two output shafts of the second reversing mechanism of bevel gears are respectively connected two input shafts of the first reversing mechanism of bevel gears on two sides of the top surface of the upper beam. Output shafts of the first reversing mechanism of bevel gears are connected to input shafts of the worm and worm wheel lifting mechanism on two sides of the top surface of the upper beam via the connecting shaft. An output shaft of the worm and worm wheel lifting mechanism is connected to an upper end of the fine adjustment mechanism. A lower end of the fine adjustment mechanism is connected to pairs of the movable wedges. The fixed wedges are disposed on the connecting beam and the pressing mechanism, and cooperate with the movable wedges.

In a class of this embodiment, the first upper blade comprises two circular segments. A ratio of a length of a first circular segment to a length of a second circular segment $L1:L2=4:25$, and a ratio of a radius of the second circular segment $R2$ to a radius of the first circular segment $R1$ is $2:1$. When in use, the second circular segment $R2$ is configured to perform rolling cut, and the first circular segment $R1$ is used for tool retracting following the rolling cut.

Advantages of the hydraulic two-side rolling-cut shears according to embodiments of the invention are summarized as follows:

During the rolling cut, the entry drive linkage and the exit drive linkage have phase difference, and the rolling cut using the first upper blade and the static liner first lower blade is realized thereby. The movable hydraulic rolling-cut shears and the fixed hydraulic rolling-cut shears is synchronously controlled. The scrap chopping mechanism employs the third hydraulic cylinder to drive the ninth connecting rod and the tenth connecting rod, so that the second upper blade on the second upper tool post is driven to move up and down, and that the second upper blade coordinates with the second lower blade to crush the steel scraps produced by the rolling cut. Therefore, compared with the conventional shears, the hydraulic two-side rolling-cut shears is convenient to maintain and reliable, feature compact structure, strong shear power, high accuracy and quality, and low production and operation costs.

BRIEF DESCRIPTION OF THE DRAWINGS

The invention is described hereinbelow with reference to the accompanying drawings, in which.

DETAILED DESCRIPTION OF THE EMBODIMENTS

Figure 1:
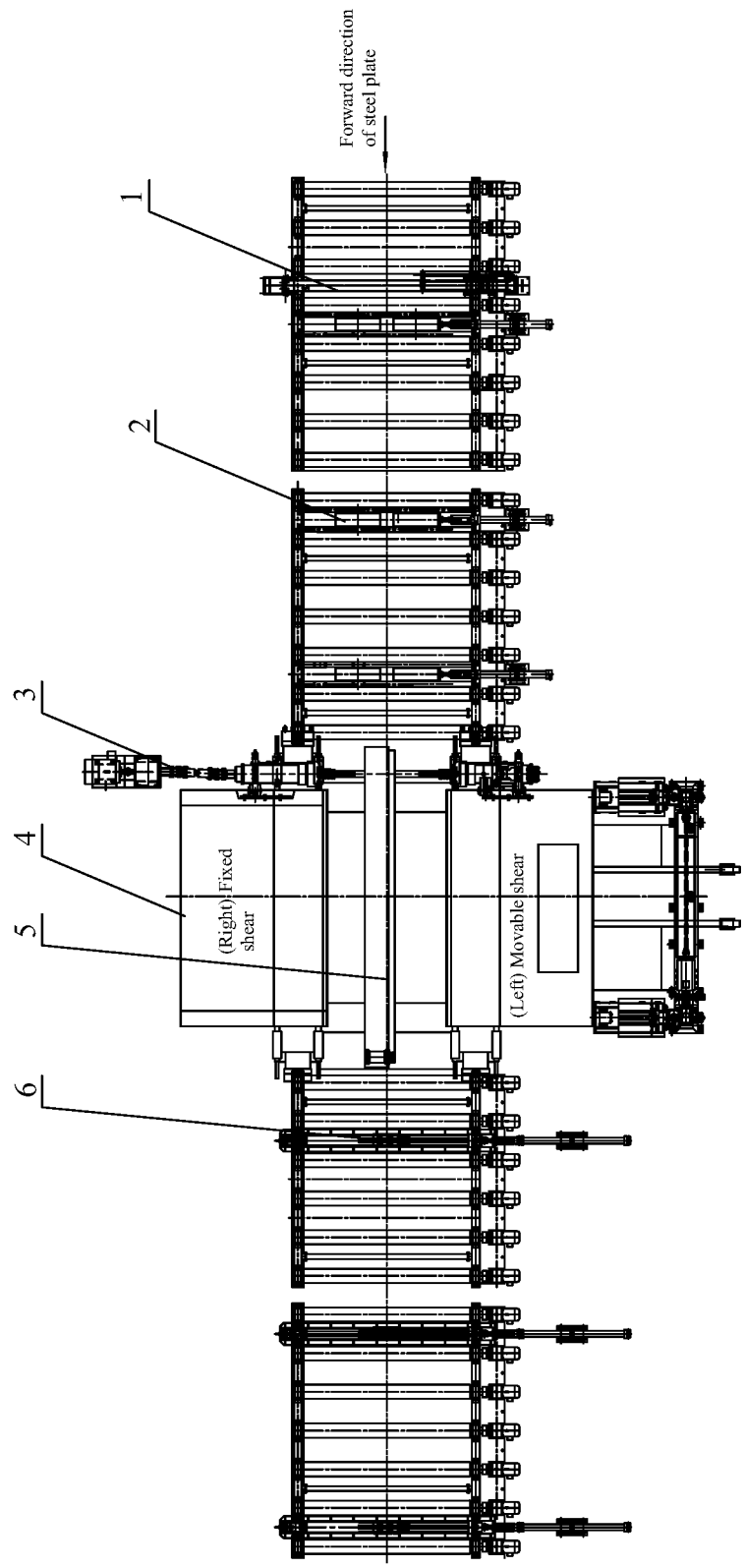
FIG. 1 is a schematic diagram of hydraulic two-side rolling-cut shears in accordance with one embodiment of the invention.

For further illustrating the invention, experiments detailing hydraulic two-side rolling-cut shears is described below.

As shown in FIGS. 1-17, hydraulic two-side rolling-cut shears, comprising a front transport roller device and a rear transport roller device, a shear body 4, and a roller carrier 5. The front transport roller device comprises a laser scriber 1, a magnetic alignment device 2, and a pinch roller device 3. The laser scriber 1 is disposed on a front end of the front transport roller device. The magnetic alignment device 2 is disposed in a middle part of the front transport roller device. The pinch roller device 3 is disposed on a rear end of the front transport roller device in front of the shear body 4. The roller carrier 5 is disposed longitudinally in the middle of the shear body 4. The rear transport roller device comprises a vertical guide roller 6. The vertical guide roller 6 is disposed on the rear transport roller device in the rear of the shear body 4. The laser scriber 1 comprises a fixed laser head and a movable laser head. The movable laser head moves synchronously with a movable hydraulic rolling-cut shears, and the laser rays projected from the movable laser head is used to judge whether the steel plate is aligned. The magnetic alignment device 2 employs electromagnet and mobile car to adjust the position of the steel plate and ensure two laser rays projected from the laser scriber always on steel plate. The pin roller device 3 is driven on the lower part thereof, and an upper part is passive. The pin roller device is configured to stepwise transport the steel plate and prevent deviation of long steel plates and built-up edge. The shear body comprises the movable hydraulic rolling-cut shears and a fixed hydraulic rolling-cut shears, and is configured to conduct stepwise cutting on two sides of the steel plate. The position of the movable hydraulic rolling cut shears is adjustable according to the widths of different steel plates. The roller carrier 5 is disposed between the movable hydraulic rolling-cut shears and the fixed hydraulic rolling-cut shears, and moves towards the same direction with the movable hydraulic rolling-cut shears at half the rate of the movable hydraulic rolling-cut shears so as to support the steel plate during the rolling cut. The vertical guide roller 6 is disposed at an outlet side of the shear body, and following the rolling cut, a roll surface line of the vertical guide roller contacts with the edge of the steel plate, preventing deviation of the steel plate during the rolling cut.

Figure 2:
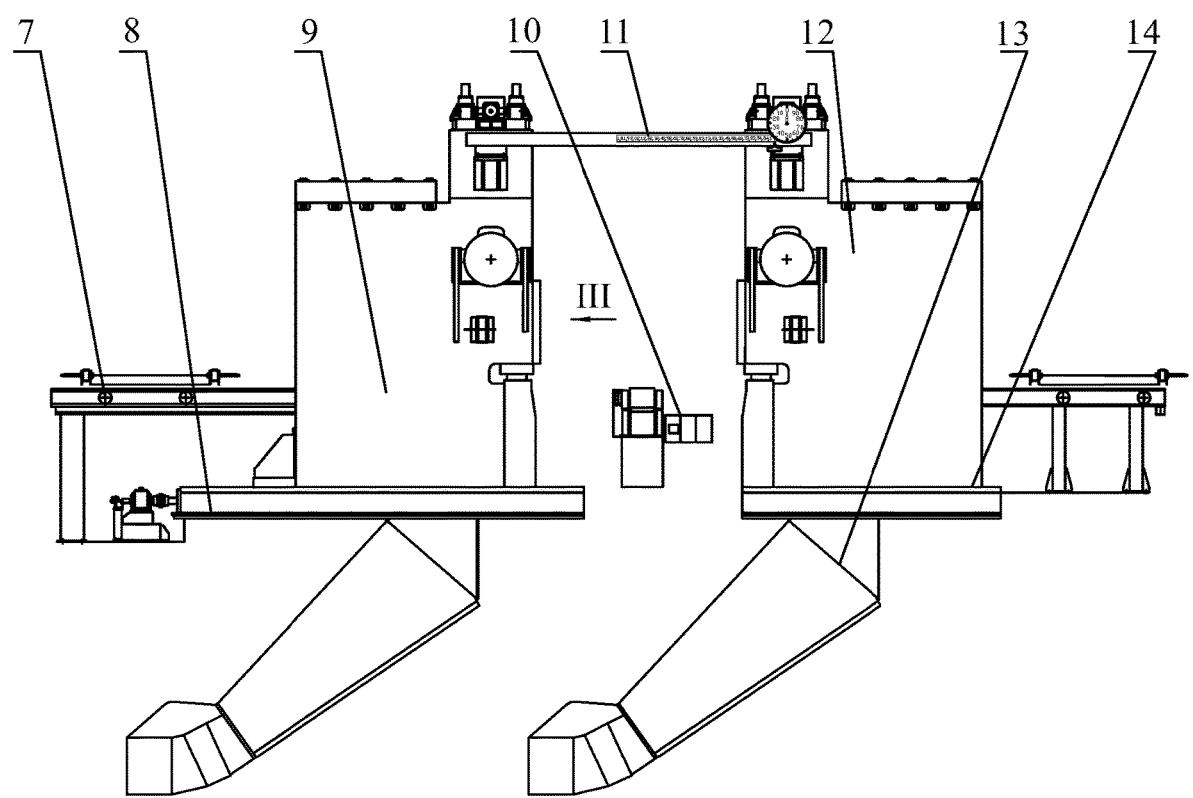
FIG. 2 is a front view of hydraulic two-side rolling-cut shears in accordance with one embodiment of the invention.
Figure 3:
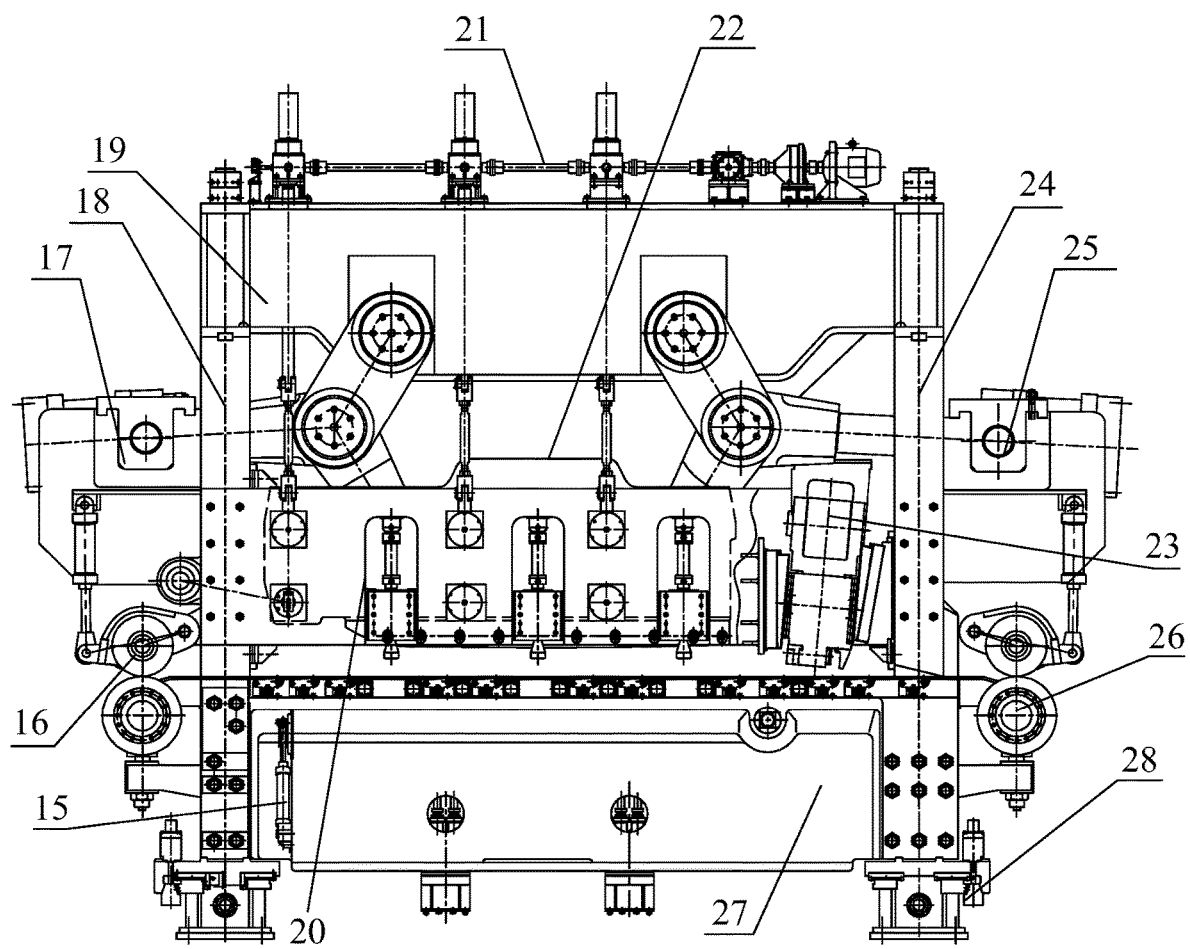
FIG. 3 is a cross-sectional view taken from direction III in FIG. 2.

As shown in FIGS. 2-3, the shear body 4 comprises a first hydraulic rolling-cut shears 9, a second hydraulic rolling-cut shears 12, a tool changing mechanism 7, and a locking device 28. A first hydraulic rolling-cut shears 9 are mounted on a movable base 8 to form a movable hydraulic rolling-cut shears. The movable hydraulic rolling-cut shears is configured to move on a guide rail. The locking device 28 is disposed on bottoms of an entry rack 18 and an exit rack 24 of the movable hydraulic rolling-cut shears 9 to lock the movable hydraulic rolling cut shears 9 on the movable base 8 when a shearing width of steel plate is adjusted. The second hydraulic rolling-cut shears 12 are disposed on a fixed base 14 to form a fixed hydraulic rolling-cut shears. The first hydraulic rolling-cut shears 9 and the second hydraulic rolling-cut shears are symmetrically disposed. The tool changing mechanism 7 is disposed at the same side of the first hydraulic rolling-cut shears 9 and the second hydraulic rolling-cut shears 12. A discharge chute 13 is connected to a sliding chute 31. A width display device 11 is disposed on an upper part of the first hydraulic rolling-cut shears 9. A transmission device 10 is disposed on the roller carrier 5.

Figure 4:
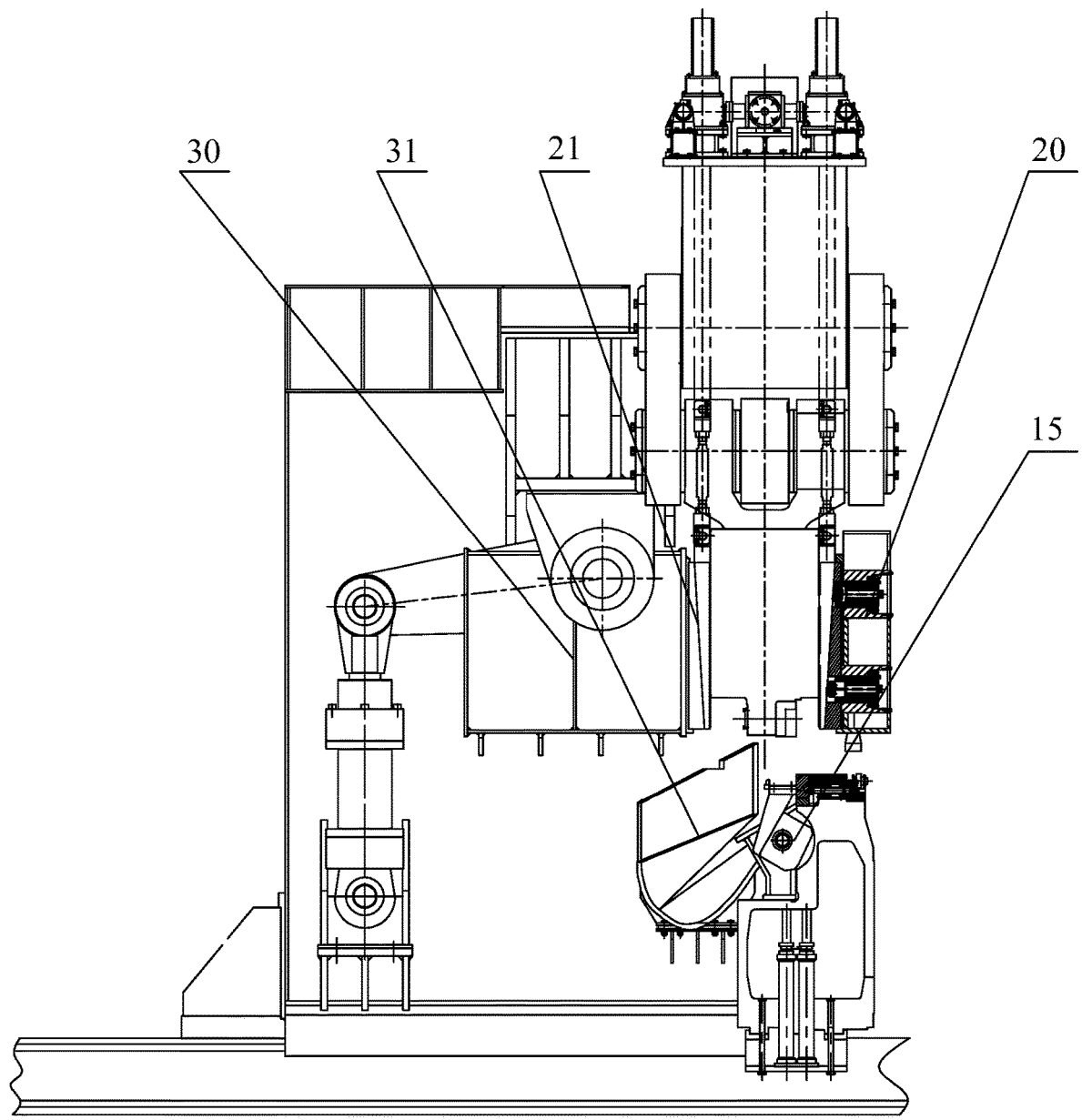
FIG. 4 is a left view of FIG. 3.

As shown in FIGS. 3-4, the first hydraulic rolling-cut shears and the second hydraulic rolling cut shears each comprise an entry pinch roll 16, an entry drive linkage 17, the entry rack 18, an upper beam 19, a pressing mechanism 20, an adjusting mechanism 21, a first upper tool post 22, a scrap chopping mechanism 23, the exit rack 24, an exit drive linkage 25, a lower tool post 27, an exit pinch roll 26, a turning device 15, a connecting beam 30, and the sliding chute 31. The entry pinch roll, the entry drive linkage, and the entry rack are disposed at an inlet of the first hydraulic rolling-cut shears and the second hydraulic rolling cut shears. The exit rack, the exit drive linkage, and the exit pinch roll are disposed at an outlet of the first hydraulic rolling-cut shears and the second hydraulic rolling cut shears. The entry pinch roll 16 is disposed at a front end of the entry rack 18. The entry drive linkage 17 is mounted on the entry rack 18 and is connected to the upper beam 19 and one side of the first upper tool post 22. Two ends of the upper beam 19 are mounted on upper parts of the entry rack 18 and the exit rack 24. The first upper tool post 22 is disposed at the middle between the entry rack 18 and the exit rack 24, and is driven by the entry drive linkage 17 and the exit drive linkage 25 to move. The exit drive linkage 25 is mounted on the exit rack 24, and is connected to the upper beam 19 and the other side of the first upper tool post 22. The exit pinch roll 26 is disposed lower than the exit rack 24. The pressing mechanism 20 is disposed on one end of the first upper tool post 22. The adjusting mechanism 21 is disposed on a top surface of the upper beam 19. The adjusting mechanism comprises pairs of movable wedges 59. Pairs of the movable wedges contact with the first upper tool post 22. The lower tool post 27 is disposed lower than the entry rack 18, the exit rack 24, and the first upper tool post 22. The turning device 15 is mounted on a front end of the lower tool post 27. The connecting beam 30 is disposed on the other end of the first upper tool post 22. The scrap chopping mechanism 23 is disposed on the connecting beam 30 and at an inner side of the exit rack 24. The sliding chute 31 is disposed on one side of the lower tool post 27.

Figure 5:
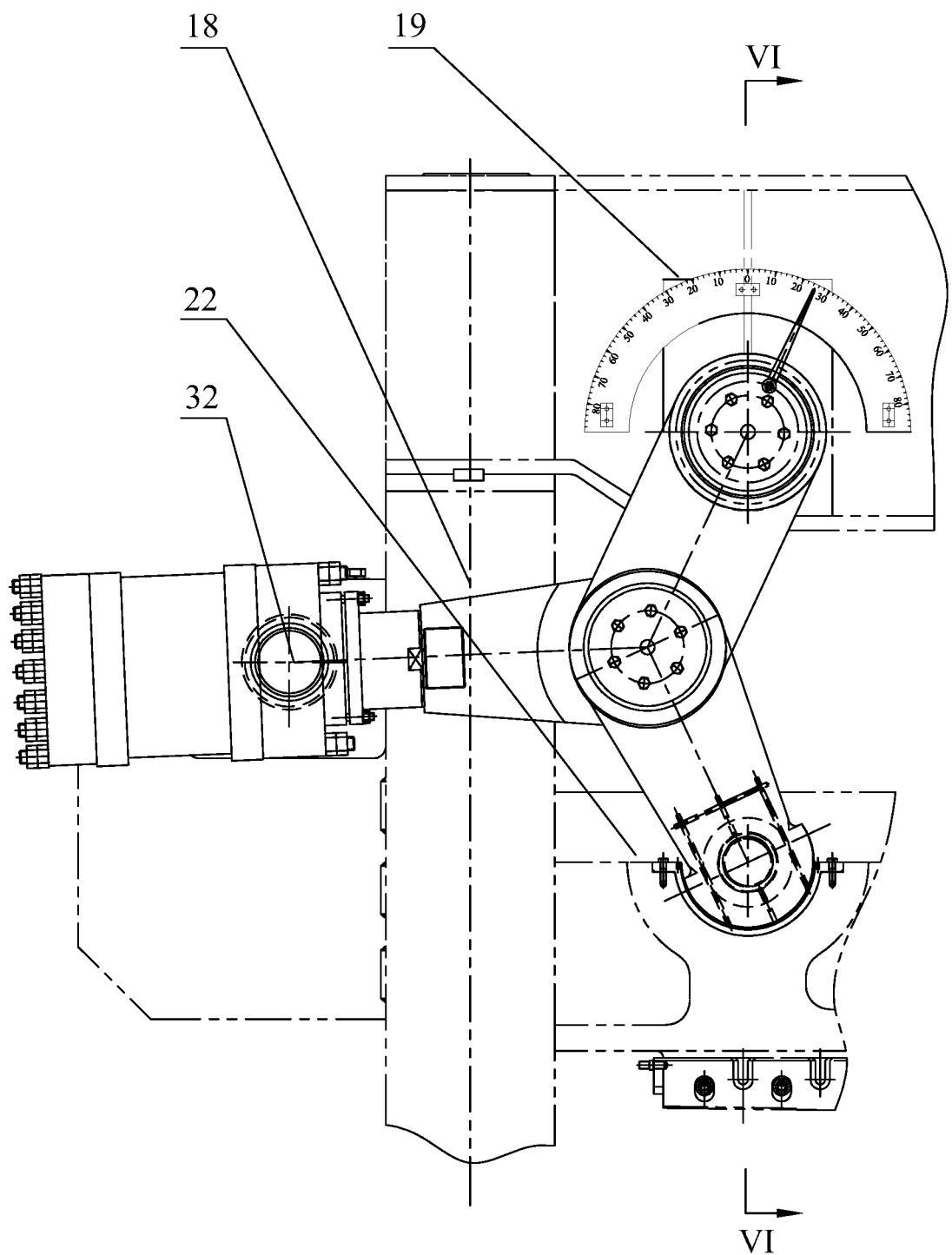
FIG. 5 is a schematic diagram of an entry drive linkage of hydraulic two-side rolling-cut shears in accordance with one embodiment of the invention.
Figure 6:
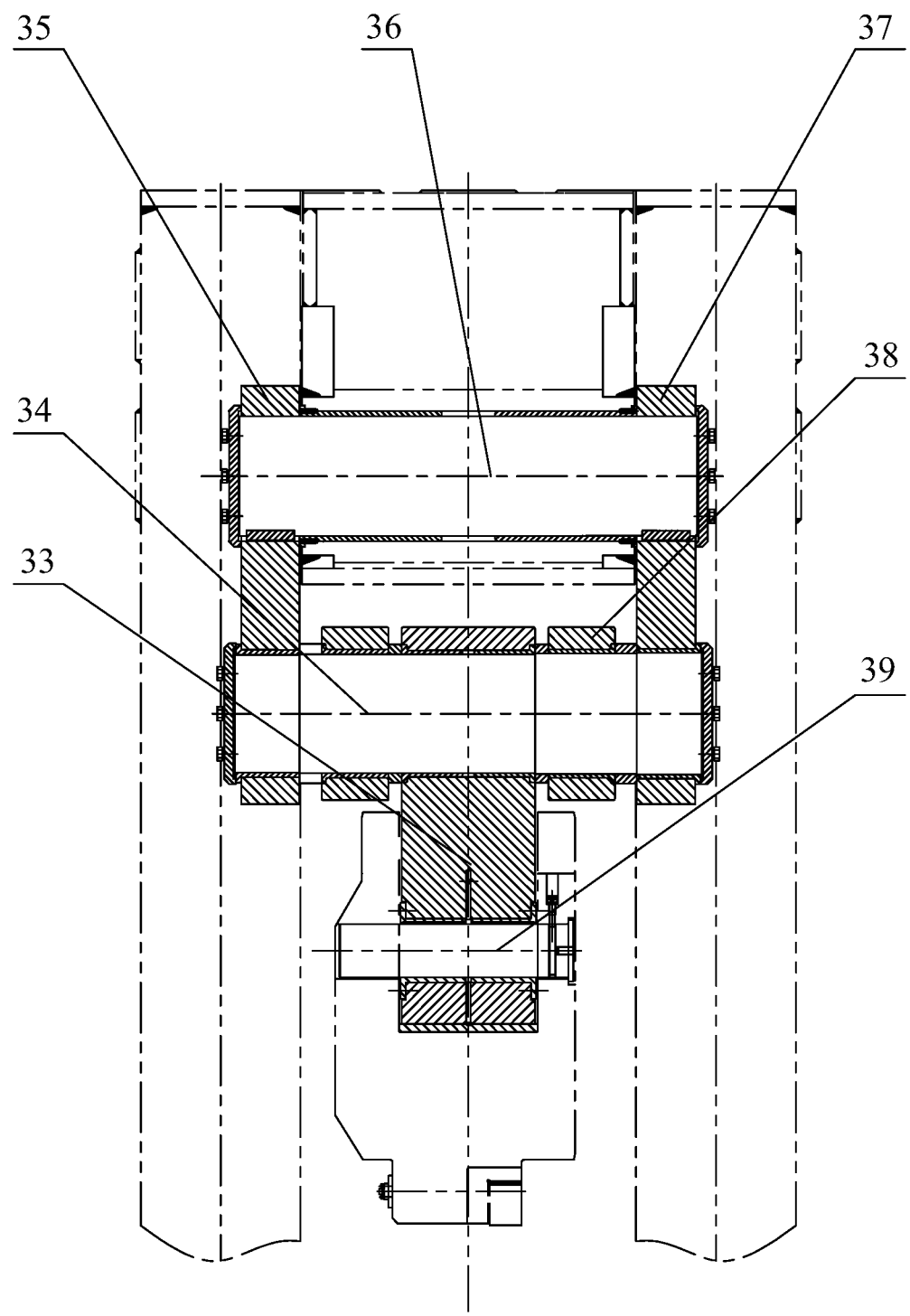
FIG. 6 is a cross-sectional view taken from part VI-VI in FIG. 5.

As shown in FIGS. 5-6, the entry drive linkage 17 comprises a first servo hydraulic cylinder 32, a first connecting rod 33, a second connecting rod 35, a third connecting rod 37, a fourth connecting rod 38, a first pin shaft 34, a second pin shaft 36, and a third pin shaft 39. The first servo hydraulic cylinder, the first connecting rod, the second connecting rod, the third connecting rod, the fourth connecting rod, the first pin shaft, the second pin shaft, and the third pin shaft are disposed at the inlet of the first hydraulic rolling-cut shears and the second hydraulic rolling cut shears. The first servo hydraulic cylinder 32 is hinged to the entry rack 18. A piston rod of the first servo hydraulic cylinder 32 is connected to one end of the fourth connecting rod 38. The other end of the fourth connecting rod 38 is hinged to one end of the first connecting rod 33, one end of the second connecting rod 35, and one end of the third connecting rod 37 via the first pin shaft 34. The other end of the first connecting rod 33 is hinged to an inlet side of the first upper tool post 22 via the third pin shaft 39 to drive the first upper tool post. The other end of the second connecting rod 35 and the other end of the third connecting rod 37 are hinged to the upper beam 19, so as to bear shear force during the rolling cut. The connecting rods and the pin shafts of the entry drive linkage of the hydraulic rolling-cut shears is provided with self-lubricating copper sleeve, facilitating the rotation of the connecting rods and pin shafts during the rolling cut.

Figure 7:
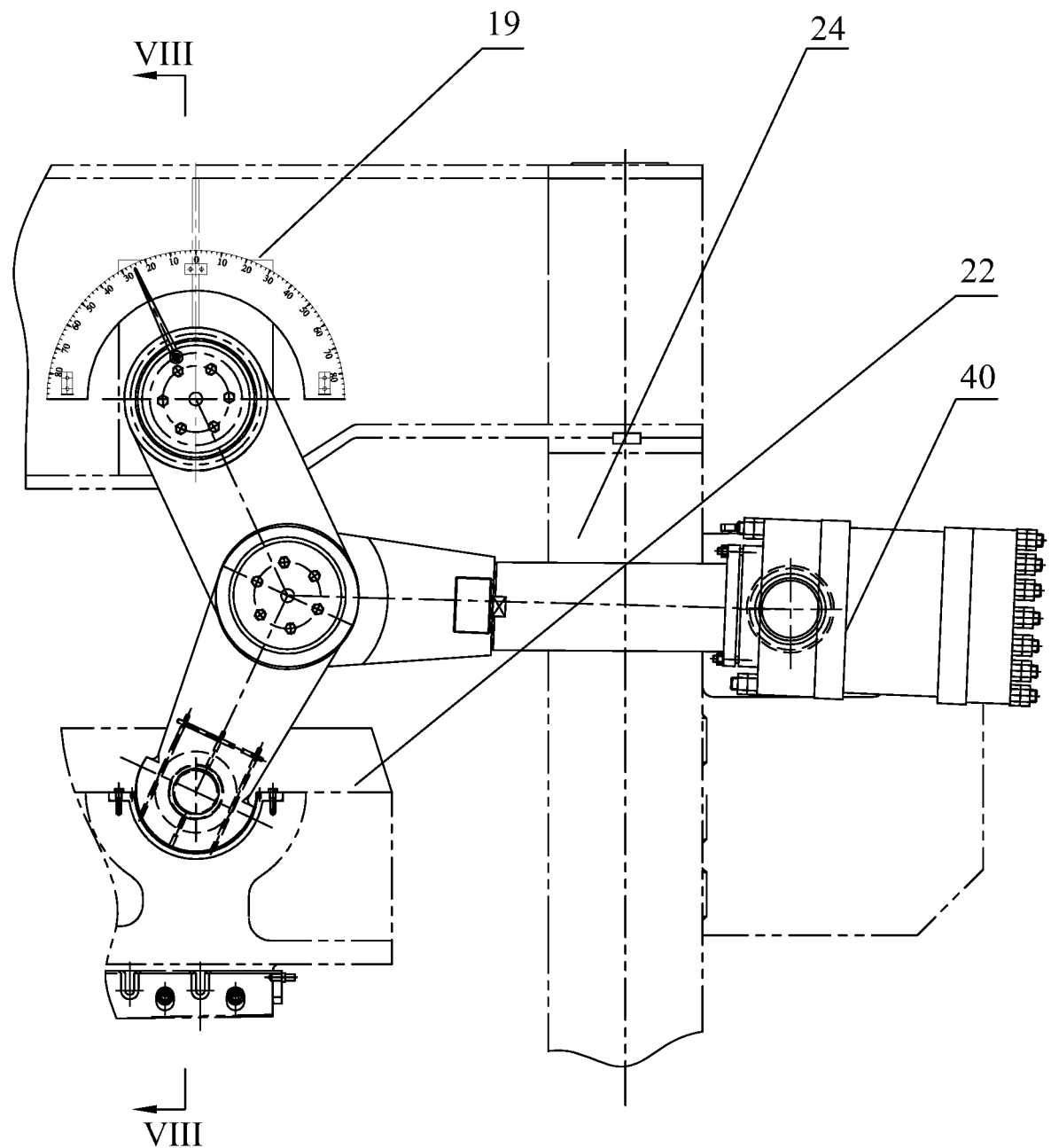
FIG. 7 is a schematic diagram of an exit drive linkage of hydraulic two-side rolling-cut shears in accordance with one embodiment of the invention.
Figure 8:
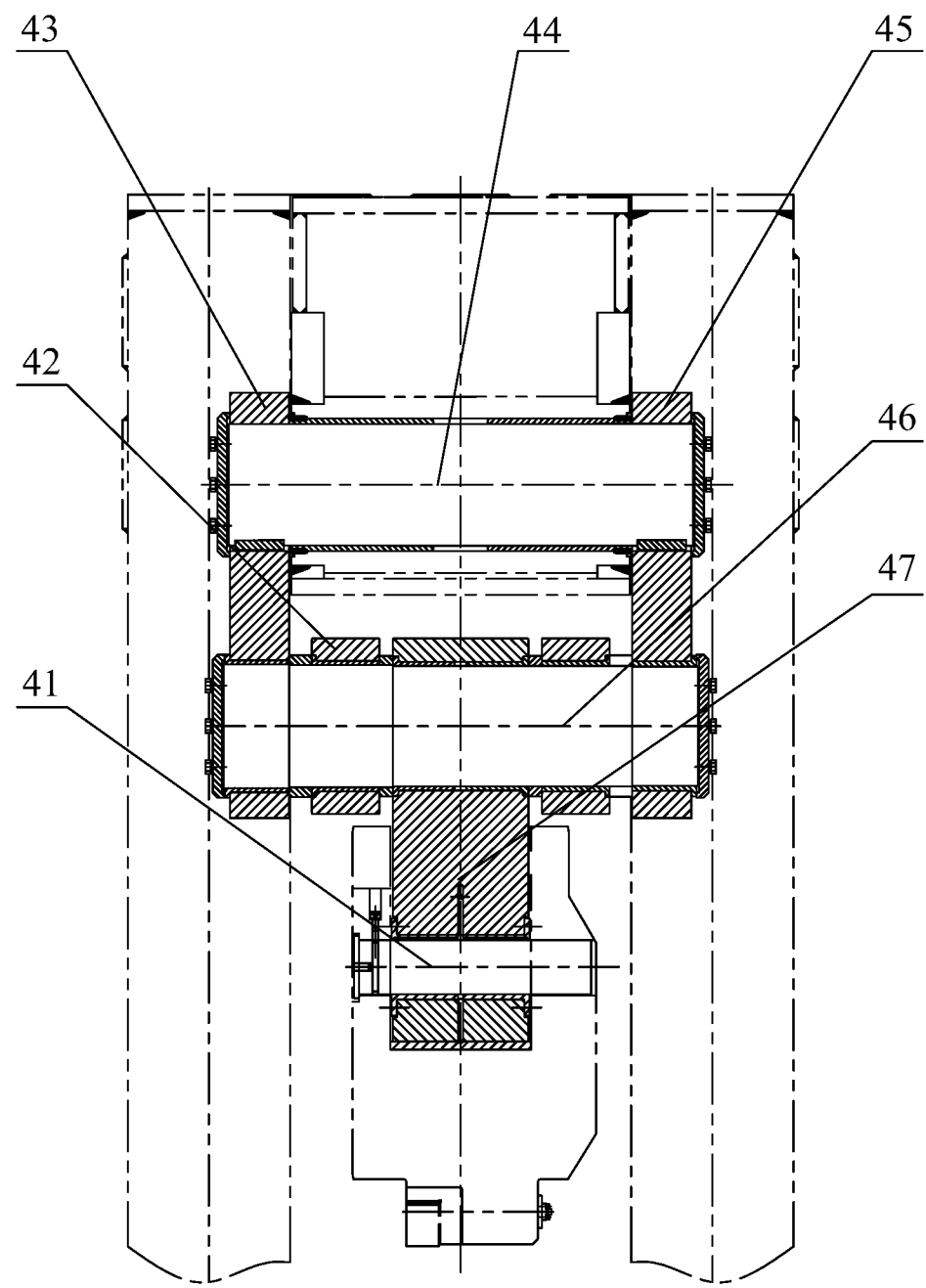
FIG. 8 is a cross-sectional view taken from part VIII-VIII in FIG. 7.

As shown in FIGS. 7-8, the exit drive linkage 25 comprises a second servo hydraulic cylinder 40, a fifth connecting rod 42, a sixth connecting rod 43, a seventh connecting rod 45, an eighth connecting rod 47, a fourth pin shaft 41, a fifth pin shaft 44, and a sixth pin shaft 46. The second servo hydraulic cylinder, the fifth connecting rod, the sixth connecting rod, the seventh connecting rod, the eighth connecting rod, the fourth pin shaft, the fifth pin shaft, and the sixth pin shaft are disposed at the outlet of the first hydraulic rolling-cut shears and the second hydraulic rolling cut shears. The second servo hydraulic cylinder 40 is hinged to the exit rack 24. A piston rod of the second servo hydraulic cylinder 40 is connected to one end of the fifth connecting rod 42. The other end of the fifth connecting rod 42 is hinged to one end of the sixth connecting rod 43, one end of the seventh connecting rod 45, and one end of the eighth connecting rod 47 via the sixth pin shaft 46. The other end of the sixth connecting rod 43 and the other end of the seventh connecting rod is hinged to one end of the fifth connecting rod 45 are hinged to the upper beam 19 via the fifth pin shaft 44. The other end of the eighth connecting rod 47 is hinged to an outlet side of the first upper tool post to drive the first upper tool post 22.

Figure 9:
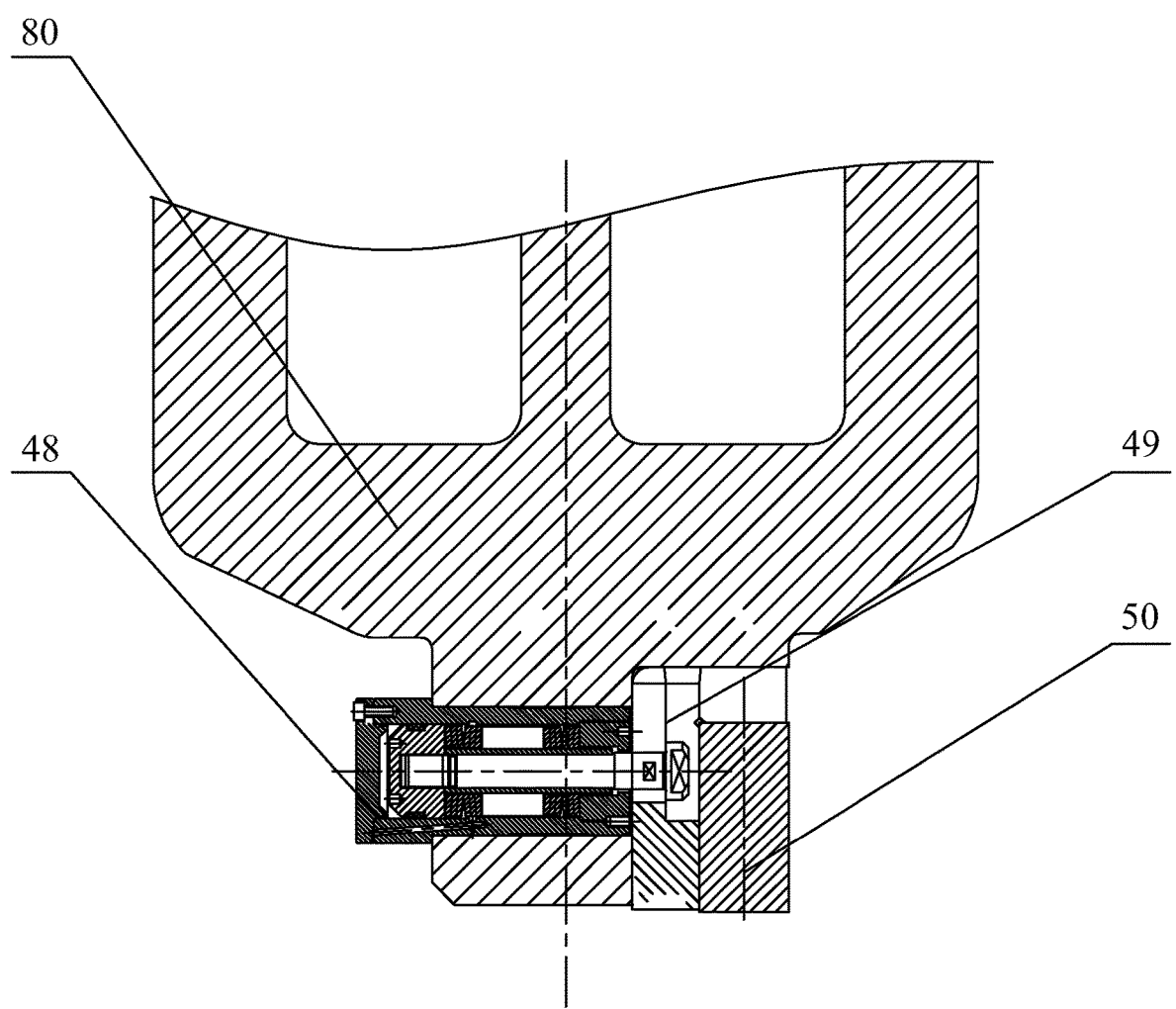
FIG. 9 is a cross-sectional view of a first upper tool post of hydraulic two-side rolling-cut shears in accordance with one embodiment of the invention.

As shown in FIG. 9, the first upper tool post 22 comprises an upper tool post body 80, an upper blade box 49, a first locking cylinder 48, and a first upper blade 50. The first upper blade 50 is mounted on the upper blade box 49. The upper blade box 49 is disposed at side of a lower part of the upper tool post body 80. A cylinder block of the first locking cylinder 48 is mounted in a first cylinder hole on the lower part of the upper tool post body 80. A piston rod of the first locking cylinder 48 is connected to a bolt of the upper blade box 49, and the upper blade box 49 is fixed on the lower part of the upper tool post body 80.

Figure 10:
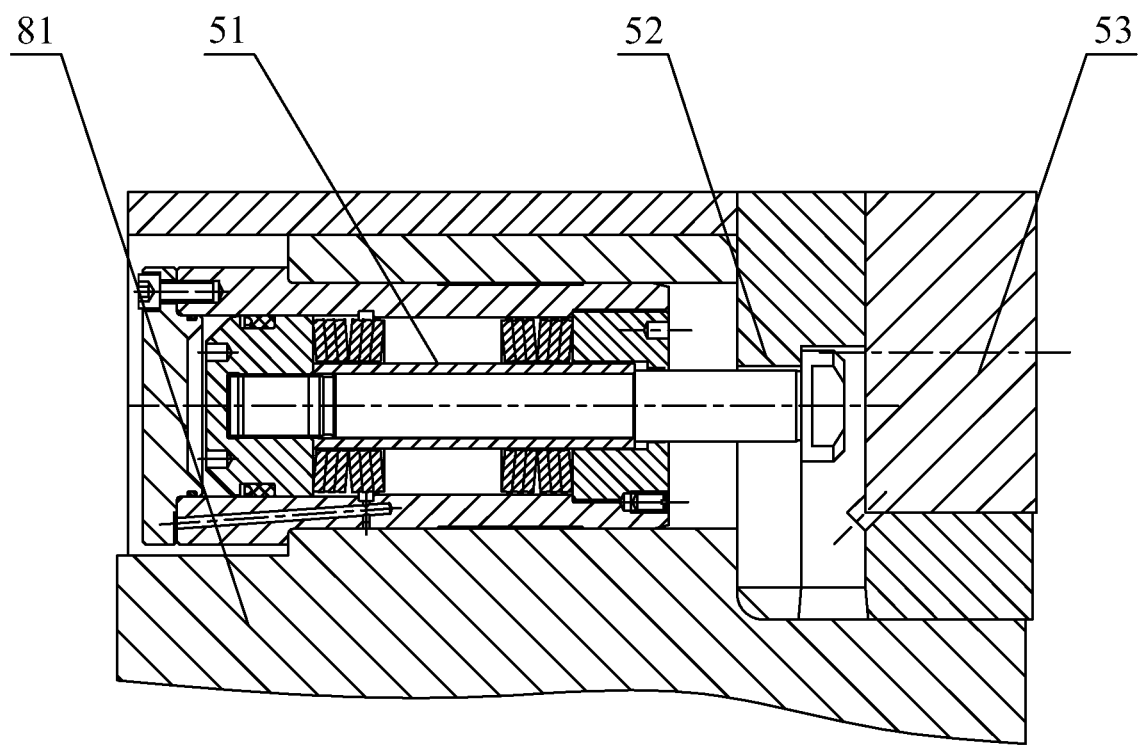
FIG. 10 is a cross-sectional view of a lower tool post of hydraulic two-side rolling-cut shears in accordance with one embodiment of the invention.

As shown in FIG. 10, the lower tool post 27 comprises a lower tool post body 81, a lower blade box 52, a second locking cylinder 51, and a first lower blade 53. The first lower blade 53 is mounted on the lower blade box 52. The lower blade box 52 is disposed at one side of an upper part of the lower tool post body 81. A cylinder block of the second locking cylinder 51 is mounted in a second cylinder hole on the upper part of the lower tool post body 81. A piston rod of the second locking cylinder 51 is connected to a bolt of the lower blade box 52, and the lower blade box 52 is fixed on the upper part of the lower tool post body 81.

Figure 11:
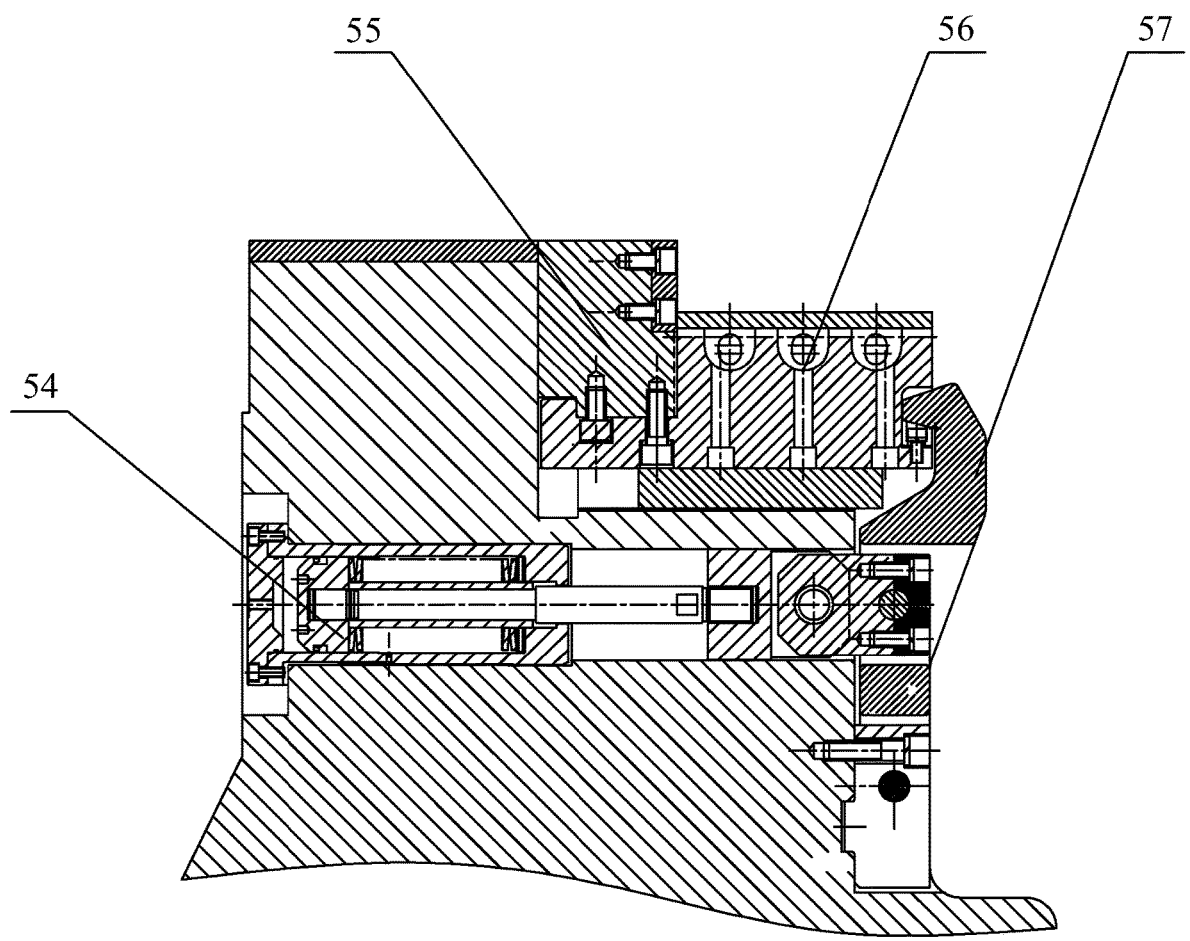
FIG. 11 is a cross-sectional view of a second lower blade of hydraulic two-side rolling-cut shears in accordance with one embodiment of the invention.
Figure 14:
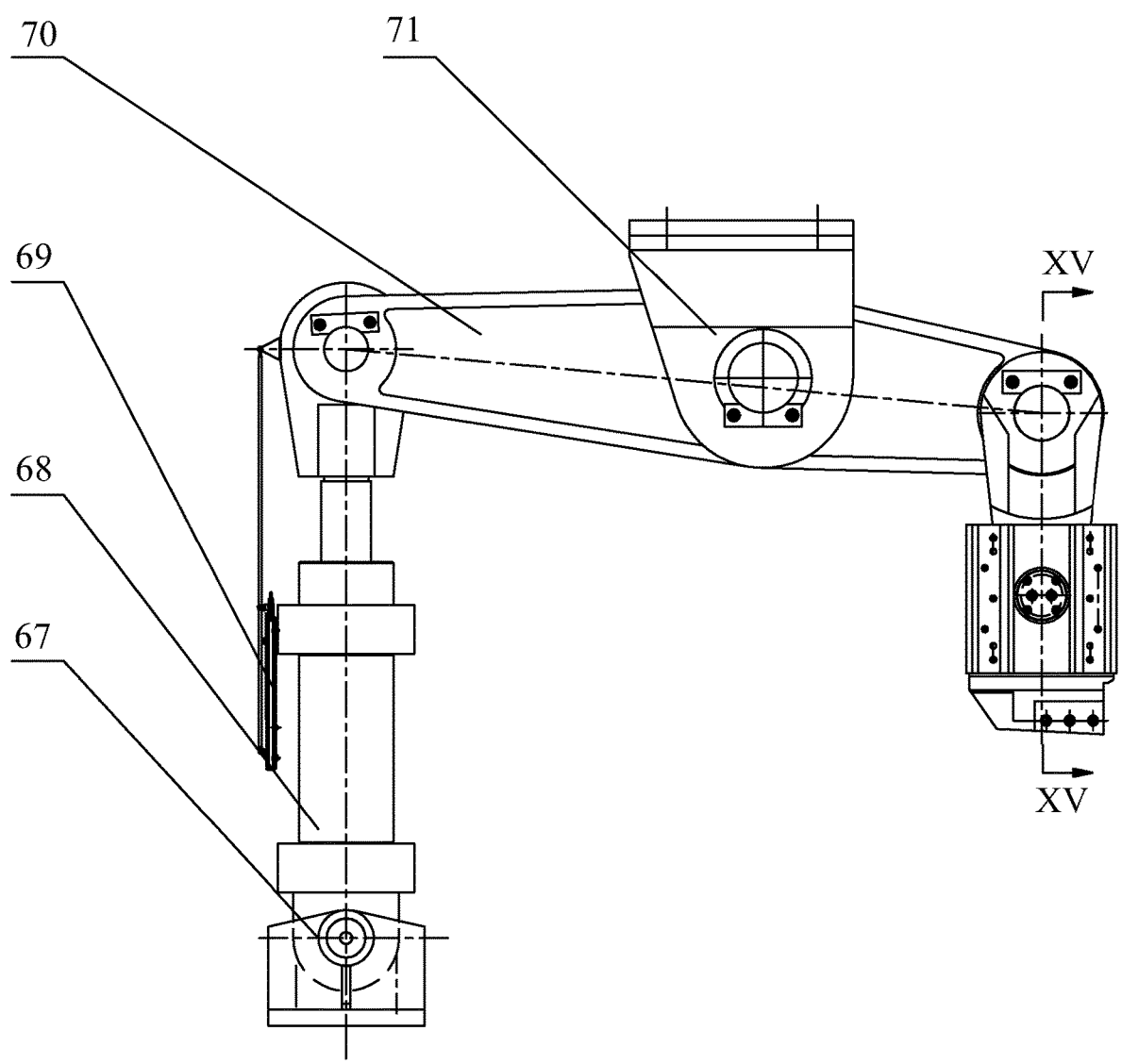
FIG. 14 is a schematic diagram of an upper blade mechanism, a third hydraulic cylinder, and a linkage mechanism of a scrap chopping mechanism of hydraulic two-side rolling-cut shears in accordance with one embodiment of the invention.
Figure 15:
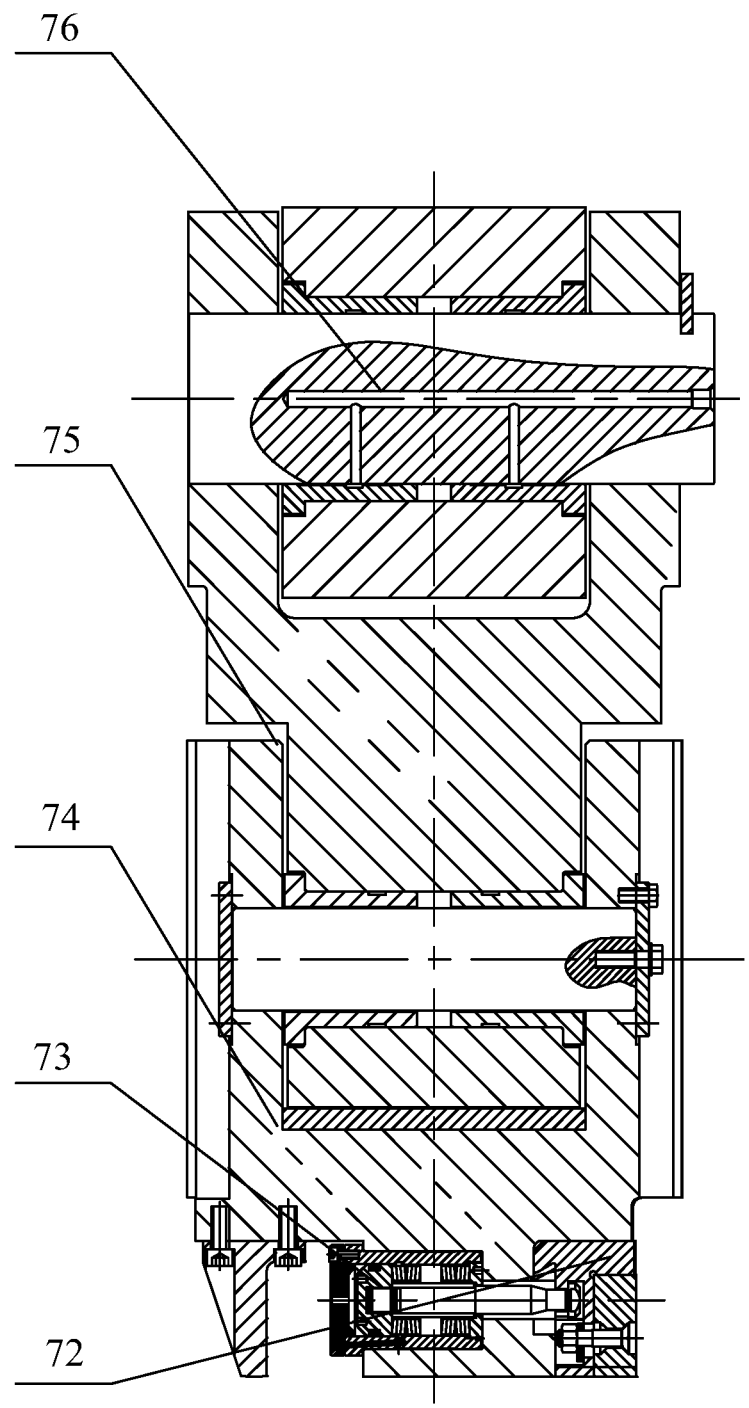
FIG. 15 is a cross-sectional view taken from part XV-XV in FIG. 14.

As shown in FIGS. 11, 14, and 15, the scrap chopping mechanism 23 comprises a third hydraulic cylinder 68, an upper blade mechanism, a lower blade mechanism, a linkage mechanism, a hydraulic cylinder base 67, and a base 71. The lower blade mechanism comprises a third locking cylinder 54, a second lower blade 55, a pressing block 56, and a locking hook 57. The second lower blade 55 is mounted on one side of the pressing block 56. The third locking cylinder 54 is mounted in a third cylinder hole on the lower tool post 27. A piston rod of the third locking cylinder 54 is connected to the locking hook 57. The locking hook 57 is disposed on one side of the lower tool post 27, and the second lower blade 55 is fixed on the lower tool post 27. The upper blade mechanism comprises a second upper blade 72, a fourth locking cylinder 73, a second upper tool post 74. The second upper blade 72 is disposed on one side of a lower part of the second upper tool post 74. The fourth locking cylinder 73 is mounted in a fourth cylinder hole on the lower part of the second upper tool post 74. A piston rod of the fourth locking cylinder 73 is connected to bolt of the second upper tool post, and the second upper blade 72 is fixed on the second upper tool post 74. The linkage mechanism comprises a ninth connecting rod 70, a tenth connecting rod 75, and a seventh pin shaft 76. A front end of the ninth connecting rod 70 is hinged to an upper part of the tenth connecting rod 75 via the seventh pin shaft 76, and a lower part of the tenth connecting rod 75 is connected to an upper part of the second upper tool post 74. The hydraulic cylinder base 67 is disposed on the exit rack 24. A cylinder block of the third hydraulic cylinder 68 is hinged to the hydraulic cylinder base 67. A piston rod of the third hydraulic cylinder 68 is hinged to a rear end of the ninth connecting rod 70. The ninth connecting rod 70 is hinged to the base 71 via an eighth pin shaft. The base 71 is disposed on an upper part of the exit rack 24. A displacement detecting sensor 69 is disposed on an end of the cylinder block and the piston rod of the third hydraulic cylinder 68 to detect the working stroke of the third hydraulic cylinder.

Figure 12:
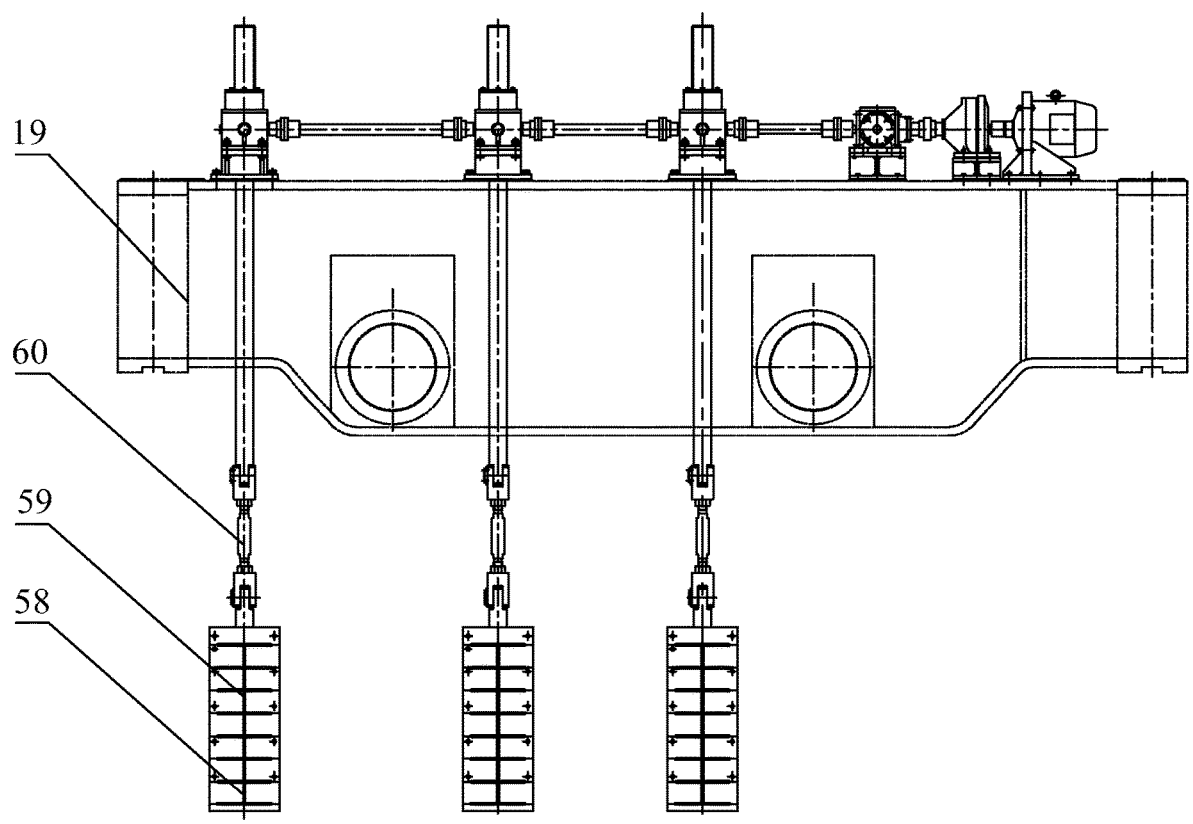
FIG. 12 is a front view of an adjusting mechanism of hydraulic two-side rolling-cut shears in accordance with one embodiment of the invention.
Figure 13:
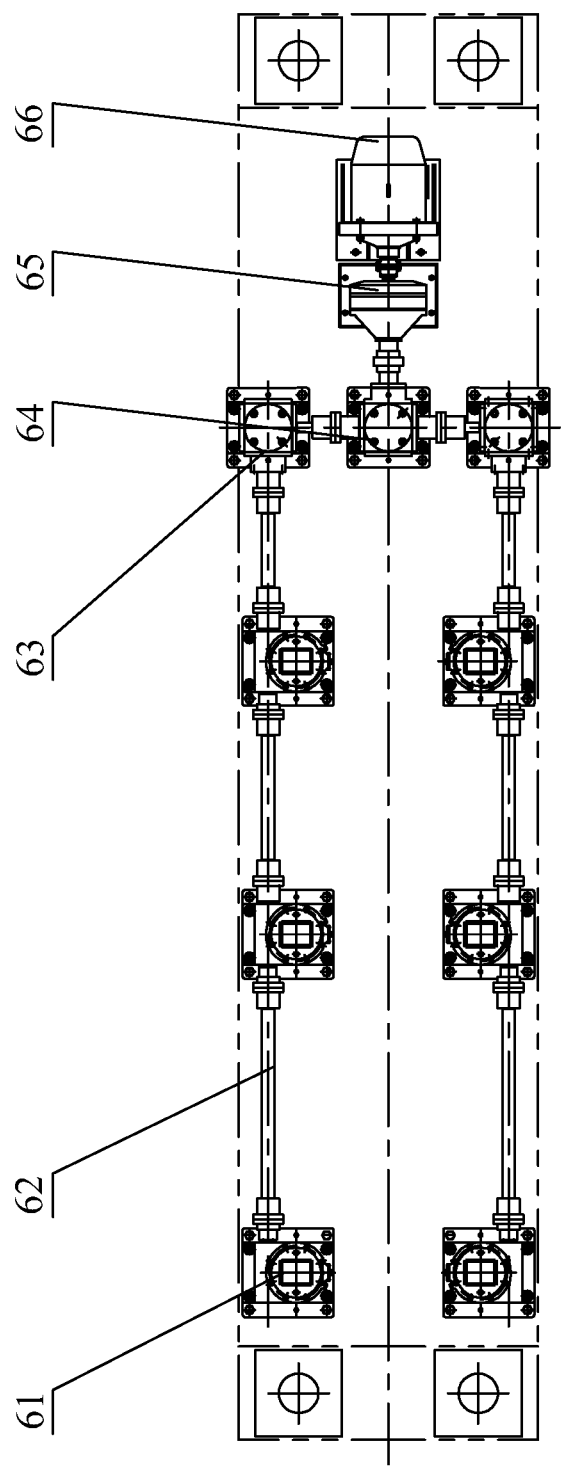
FIG. 13 is a top view of FIG. 12.

As shown in FIGS. 12-13, the adjusting mechanism 21 comprises pairs of fixed wedges 58, pairs of the movable wedges 59, a fine adjustment mechanism 60, a worm and worm wheel lifting mechanism 61, a connecting shaft 62, a first reversing mechanism 63 of bevel gears, a second reversing mechanism 64 of bevel gears, a reducer 65, and a motor 66. A shaft of the motor 66 is connected to an input shaft of the reducer 65. An output shaft of the reducer 65 is connected to an input shaft of the second reversing mechanism 64 of bevel gears. Two output shafts of the second reversing mechanism 64 of bevel gears are respectively connected two input shafts of the first reversing mechanism 63 of bevel gears on two sides of the top surface of the upper beam 19. Output shafts of the first reversing mechanism 63 of bevel gears are connected to input shafts of the worm and worm wheel lifting mechanism 61 on two sides of the top surface of the upper beam 19 via the connecting shaft 62. An output shaft of the worm and worm wheel lifting mechanism 61 is connected to an upper end of the fine adjustment mechanism 60. A lower end of the fine adjustment mechanism 60 is connected to pairs of the movable wedges 59. The fixed wedges 58 are disposed on the connecting beam 30 and the pressing mechanism 20, and cooperate with the movable wedges 59. The movable wedges 59 are connected to the worm and worm wheel lifting mechanism 61 via the fine adjustment mechanism 60. The fine adjustment mechanism 60 is configured to eliminate the clearance between the fixed wedges 58 and the movable wedges 59. The motor 66 and the reducer 65 are connected together so as to drive the worm and worm wheel lifting mechanism 61 to move up and down, drive the movable wedges 59 to perform same-side synchronized movement and opposite-side reverse movement, and realize the blade gap adjustment and blade retraction via the first reversing mechanism 63 of bevel gears, the second reversing mechanism 64 of bevel gear, and the connecting shaft 62. The pressing mechanism 77 is configured to always press the movable wedges 59 so that the movable wedges closely fit to the first upper tool post 22, and a no-gap shearing is realized.

Figure 16:
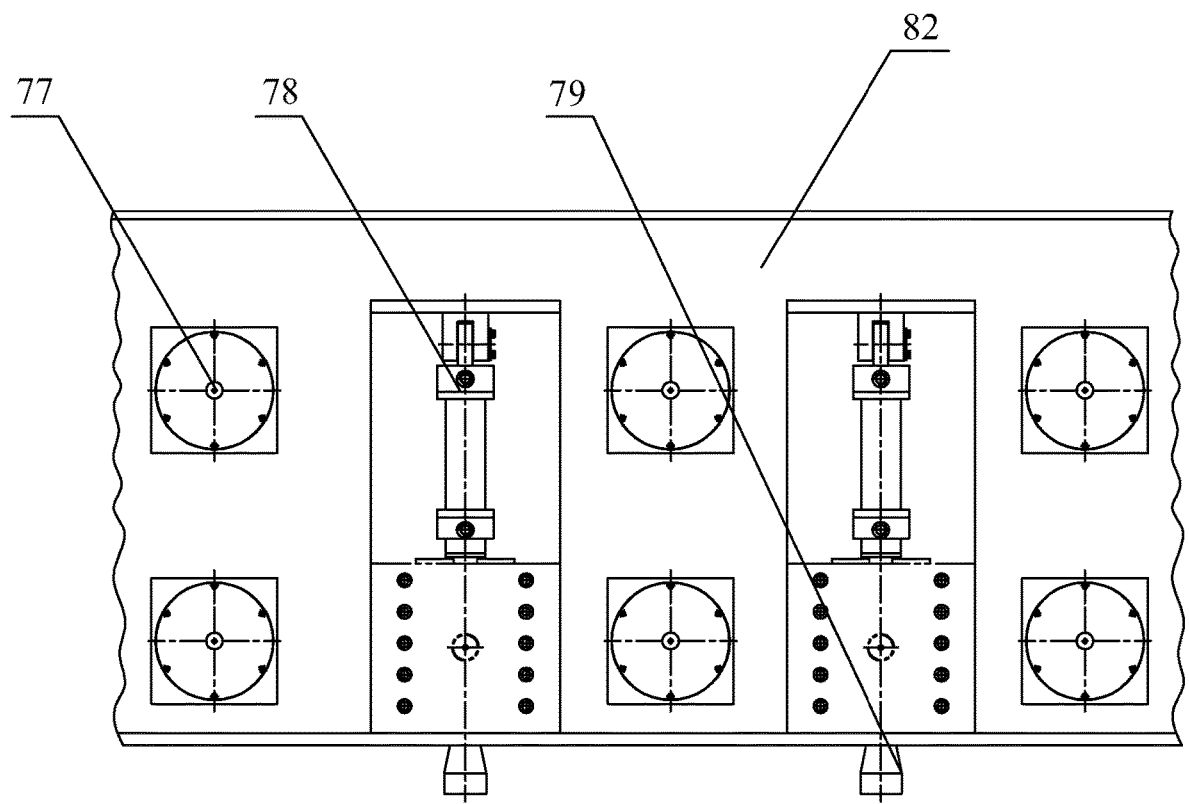
FIG. 16 is a front view of a pressing mechanism of hydraulic two-side rolling-cut shears in accordance with one embodiment of the invention.

As shown in FIG. 16, the pressing mechanism 20 comprises a box body 82, a push broach mechanism 77, a fourth hydraulic cylinder 78, and feet 79. A cylinder block of the fourth hydraulic cylinder 78 is disposed in the box body 82. An end of a piston rod of the fourth hydraulic cylinder 78 is connected to the feet 79. The push broach mechanism 77 is transversely disposed in the box body 82.

Figure 17:
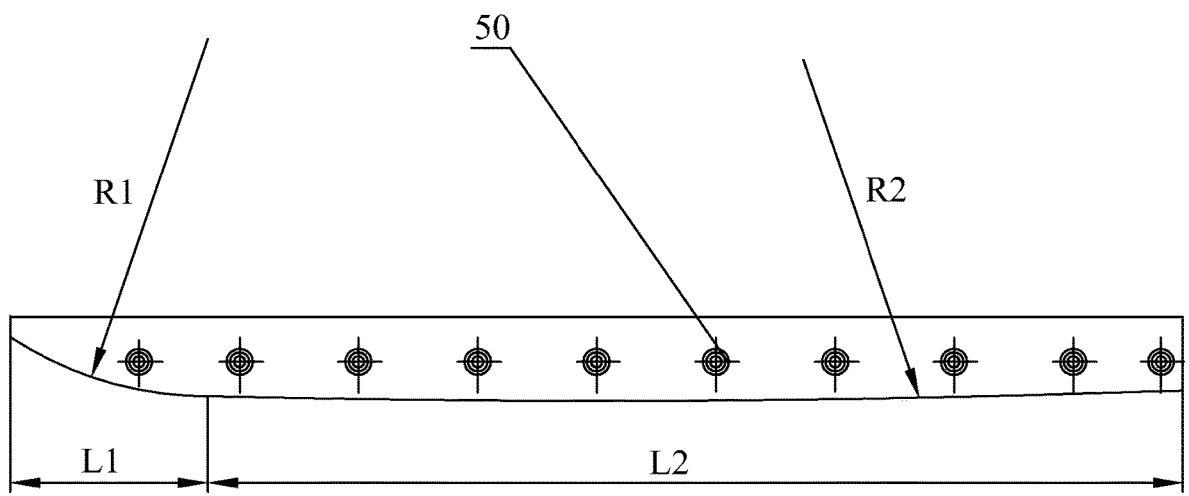
FIG. 17 is a schematic diagram of a first upper blade of hydraulic two-side rolling-cut shears in accordance with one embodiment of the invention.

As shown in FIG. 17, the first upper blade 50 comprises two circular segments. A ratio of a length of a first circular segment to a length of a second circular segment L1:L2=4:25. When in use, the second circular segment R2 is configured to perform rolling cut, and the first circular segment R1 is used for tool retracting following the rolling cut, and the ratio of the radius of the second circular segment R2 to the radius of the first circular segment R1 is 2:1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. Shears, comprising:
a front transport roller device; the front transport roller device comprising a laser scriber, a magnetic alignment device, and a pinch roller device;
a rear transport roller device; the rear transport roller device comprising a vertical guide roller;
a shear body; the shear body comprising a first hydraulic rolling-cut shears and a second hydraulic rolling-cut shears; each of the first hydraulic rolling-cut shears and the second hydraulic rolling-cut shears comprising an entry pinch roll, an entry drive linkage, an entry rack, an upper beam, a pressing mechanism, an adjusting mechanism having pairs of movable wedges, a first upper tool post, a scrap chopping mechanism, an exit rack, an exit drive linkage, a lower tool post, an exit pinch roll, a turning device, and a connecting beam; and
a roller carrier;

wherein:
the laser scriber is disposed on a front end of the front transport roller device; the magnetic alignment device is disposed in a middle part of the front transport roller device; the pinch roller device is disposed on a rear end of the front transport roller device and in front of the shear body;
the roller carrier is disposed longitudinally in a middle of the shear body;
the vertical guide roller is disposed on the rear transport roller device and behind the shear body;
the first hydraulic rolling-cut shears is mounted on a movable base to form a movable hydraulic rolling-cut shears capable of moving on a guide rail; the second hydraulic rolling-cut shears is disposed on a fixed base to form a fixed hydraulic rolling-cut shears; the first hydraulic rolling-cut shears and the second hydraulic rolling-cut shears are symmetrically disposed; and
in each of the first hydraulic rolling-cut shears and the second hydraulic rolling-cut shears:
the entry pinch roll, the entry drive linkage, and the entry rack are disposed at an inlet of the respective shears;
the exit rack, the exit drive linkage, and the exit pinch roll are disposed at an outlet of the respective shears;
the entry pinch roll is disposed at a front end of the entry rack;
the entry drive linkage is mounted on the entry rack and is connected to the upper beam and a front end of the first upper tool post;
two ends of the upper beam are respectively mounted on upper parts of the entry rack and the exit rack;
the first upper tool post is disposed at a middle between the entry rack and the exit rack, and is driven by the entry drive linkage and the exit drive linkage to move;
the exit drive linkage is mounted on the exit rack, and is connected to the upper beam and a rear end of the first upper tool post;
the exit pinch roll is disposed lower than the exit rack;
the pressing mechanism is disposed on a first side of the first upper tool post;
the adjusting mechanism is disposed on a top surface of the upper beam;
the pairs of movable wedges are in contact with the first upper tool post;
the lower tool post is disposed lower than the entry rack, the exit rack, and the first upper tool post;
the turning device is mounted on a front end of the lower tool post;
the connecting beam is disposed on a second side of the first upper tool post opposite to the first side of the first upper tool post; and
the scrap chopping mechanism is disposed on the connecting beam at an inner side of the exit rack.

2. The shears of claim 1, wherein the lower tool post comprises a lower tool post body, a lower blade box, a second locking cylinder, and a first lower blade; the first lower blade is mounted on the lower blade box; the lower blade box is disposed at one side of an upper part of the lower tool post body; a cylinder block of the second locking cylinder is mounted in a second cylinder hole on the upper part of the lower tool post body; a piston rod of the second locking cylinder is connected to a bolt of the lower blade box, and the lower blade box is fixed on the upper part of the lower tool post body.

3. The shears of claim 1, wherein the adjusting mechanism comprises pairs of fixed wedges, the pairs of movable wedges, a worm and worm wheel lifting mechanism, a plurality of connecting shafts, a first reversing mechanism of bevel gears, a second reversing mechanism of bevel gears, a reducer, and a motor; a shaft of the motor is connected to an input shaft of the reducer; an output shaft of the reducer is connected to an input shaft of the second reversing mechanism of bevel gears; two output shafts of the second reversing mechanism of bevel gears are respectively connected to two input shafts of the first reversing mechanism of bevel gears on two sides of the top surface of the upper beam; output shafts of the first reversing mechanism of bevel gears are connected to input shafts of the worm and worm wheel lifting mechanism on the two sides of the top surface of the upper beam via the plurality of connecting shafts, respectively; output shafts of the worm and worm wheel lifting mechanism are respectively connected to the pairs of movable wedges; and the pairs of fixed wedges are disposed between the connecting beam and the pressing mechanism, and cooperate with the pairs of movable wedges.

4. The shears of claim 1, wherein in each of the first hydraulic rolling-cut shears and the second hydraulic rolling-cut shears: the entry drive linkage comprises a first servo hydraulic cylinder, a first connecting rod, a second connecting rod, a third connecting rod, a fourth connecting rod, a first pin shaft, a second pin shaft, and a third pin shaft; the first servo hydraulic cylinder, the first connecting rod, the second connecting rod, the third connecting rod, the fourth connecting rod, the first pin shaft, the second pin shaft, and the third pin shaft are disposed at the inlet of the respective shears; the first servo hydraulic cylinder is hinged to the entry rack; a piston rod of the first servo hydraulic cylinder is connected to a first end of the fourth connecting rod; a second end of the fourth connecting rod is hinged to a first end of the first connecting rod, a first end of the second connecting rod, and a first end of the third connecting rod via the first pin shaft; a second end of the first connecting rod is hinged to the front end of the first upper tool post via the third pin shaft to drive the first upper tool post; and a second end of the second connecting rod and a second end of the third connecting rod are hinged to the upper beam.

5. The shears of claim 1, wherein in each of the first hydraulic rolling-cut shears and the second hydraulic rolling-cut shears: the exit drive linkage comprises a second servo hydraulic cylinder, a fifth connecting rod, a sixth connecting rod, a seventh connecting rod, an eighth connecting rod, a fourth pin shaft, a fifth pin shaft, and a sixth pin shaft; the second servo hydraulic cylinder, the fifth connecting rod, the sixth connecting rod, the seventh connecting rod, the eighth connecting rod, the fourth pin shaft, the fifth pin shaft, and the sixth pin shaft are disposed at the outlet of the respective shears; the second servo hydraulic cylinder is hinged to the exit rack; a piston rod of the second servo hydraulic cylinder is connected to a first end of the fifth connecting rod; a second end of the fifth connecting rod is hinged to a first end of the sixth connecting rod, a first end of the seventh connecting rod, and a first end of the eighth connecting rod via the sixth pin shaft; a second end of the sixth connecting rod and a second end of the seventh connecting rod are hinged to the upper beam via the fifth pin shaft; and a second end of the eighth connecting rod is hinged to the rear end of the first upper tool post to drive the first upper tool post.

6. The shears of claim 1, wherein the first upper tool post comprises an upper tool post body, an upper blade box, a first locking cylinder, and a first upper blade; the first upper blade is mounted on the upper blade box; the upper blade box is disposed at one side of a lower part of the upper tool post body; a cylinder block of the first locking cylinder is mounted in a first cylinder hole on the lower part of the upper tool post body; a piston rod of the first locking cylinder is connected to a bolt of the upper blade box, and the upper blade box is fixed on the lower part of the upper tool post body.

7. The shears of claim 6, wherein the first upper blade comprises a first circular segment and a second circular segment; a ratio of a length of the first circular segment to a length of the second circular segment is 4:25, and a ratio of a radius of the second circular segment to a radius of the first circular segment is 2:1.

8. The shears of claim 1, wherein in each of the first hydraulic rolling-cut shears and the second hydraulic rolling-cut shears: the scrap chopping mechanism comprises a third hydraulic cylinder, an upper blade mechanism, a lower blade mechanism, a linkage mechanism, a hydraulic cylinder base, and a base; the lower blade mechanism comprises a third locking cylinder, a second lower blade, a pressing block, and a locking hook; the second lower blade is mounted on one side of the pressing block; the third locking cylinder is mounted in a third cylinder hole on the lower tool post; a piston rod of the third locking cylinder is connected to the locking hook; the locking hook is disposed on one side of the lower tool post, and the second lower blade is fixed on the lower tool post; the upper blade mechanism comprises a second upper blade, a fourth locking cylinder, a second upper tool post; the second upper blade is disposed on one side of a lower part of the second upper tool post; the fourth locking cylinder is mounted in a fourth cylinder hole on the lower part of the second upper tool post; a piston rod of the fourth locking cylinder is connected to a bolt of the second upper tool post, and the second upper blade is fixed on the second upper tool post; the linkage mechanism comprises a ninth connecting rod, a tenth connecting rod, and a seventh pin shaft; a front end of the ninth connecting rod is hinged to an upper part of the tenth connecting rod via the seventh pin shaft, and a lower part of the tenth connecting rod is connected to an upper part of the second upper tool post; the hydraulic cylinder base is disposed on the exit rack; a cylinder block of the third hydraulic cylinder is hinged to the hydraulic cylinder base; a piston rod of the third hydraulic cylinder is hinged to a rear end of the ninth connecting rod; the ninth connecting rod is hinged to the base via an eighth pin shaft; and the base is disposed on an upper part of the exit rack.

* * * * *